(12) United States Patent
Hays et al.

(10) Patent No.: US 10,649,947 B2
(45) Date of Patent: May 12, 2020

(54) STACK TIMING ADJUSTMENT FOR SERIAL COMMUNICATIONS

(71) Applicant: Micro Motion, Inc., Boulder, CO (US)

(72) Inventors: Paul J Hays, Lafayette, CO (US); Chris E Eyre, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 116 days.

(21) Appl. No.: 15/509,132

(22) PCT Filed: Sep. 25, 2014

(86) PCT No.: PCT/US2014/057487
§ 371 (c)(1),
(2) Date: Mar. 6, 2017

(87) PCT Pub. No.: WO2016/048329
PCT Pub. Date: Mar. 31, 2016

(65) Prior Publication Data
US 2017/0249278 A1    Aug. 31, 2017

(51) Int. Cl.
*G06F 13/42* (2006.01)
*H04W 56/00* (2009.01)

(52) U.S. Cl.
CPC ...... *G06F 13/4226* (2013.01); *G06F 13/4213* (2013.01); *G06F 13/4239* (2013.01); *G06F 13/4282* (2013.01); *H04W 56/00* (2013.01)

(58) Field of Classification Search
CPC ............. G06F 13/4226; G06F 13/4239; G06F 13/4213; G06F 13/4282; H04W 56/00
See application file for complete search history.

(56) References Cited

U.S. PATENT DOCUMENTS

| | | | |
|---|---|---|---|
| 4,700,358 A | 10/1987 | Duncanson et al. | |
| 6,151,653 A | 11/2000 | Lin et al. | |
| 6,260,084 B1* | 7/2001 | Wilson | H04L 69/08 375/216 |
| 2002/0059479 A1* | 5/2002 | Hardy | G06F 13/385 710/1 |
| 2005/0081076 A1 | 4/2005 | Okuda | |
| 2005/0262285 A1 | 11/2005 | Kang | |
| 2006/0245533 A1* | 11/2006 | Rostampour | G06F 13/385 375/377 |
| 2007/0067458 A1 | 3/2007 | Chand | |
| 2012/0324067 A1 | 12/2012 | Hari et al. | |
| 2013/0107919 A1* | 5/2013 | Burns | H03K 7/06 375/219 |
| 2016/0084729 A1* | 3/2016 | Huseynov | G01M 3/24 73/40.5 A |

FOREIGN PATENT DOCUMENTS

| | | |
|---|---|---|
| JP | H01105645 A | 4/1989 |
| JP | 2001251324 A | 9/2001 |
| JP | 2004247856 A | 9/2004 |
| JP | 2007323464 A | 12/2007 |
| KR | 1020050070659 A | 7/2005 |

* cited by examiner

*Primary Examiner* — Idriss N Alrobaye
*Assistant Examiner* — Ronald T Modo
(74) *Attorney, Agent, or Firm* — The Ollila Law Group LLC

(57) ABSTRACT

A method for stack timing adjustment for serial communications is provided. The method includes receiving a USB communication, decoding the USB communication into UART frames, and adjusting the timing of the UART frames according to a serial protocol.

17 Claims, 8 Drawing Sheets

STACK TIMING ADJUSTMENT FOR SERIAL COMMUNICATIONS

TECHNICAL FIELD

The embodiments described below relate to protocol stacks and, more particularly, to stack timing adjustment for serial communications.

BACKGROUND

Serial communications between master and slave devices sometimes rely on timing to determine the beginning and end of a communication. For example, the Modbus communication protocol employs a master-slave arrangement in which the master initiates all communication activity. In this arrangement, the master sends a command to the slave. The slave waits for a period of time, typically 3.5 characters, before responding. If the master does not send any other data after the period of time, the slave is allowed to send a response. This arrangement ensures that only the master or the slave is communicating at a given time. Other communication protocols employ similar timing constraints such as the Highway Addressable Remote Transducer (HART) protocol. The HART protocol is a multi-master protocol with various timing constraints, such as the slave time-out (STO), link grant RT1, and link quiet RT2, that determine when a device on the network can communicate.

The serial communications are typically transmitted through a Universal Asynchronous Receiver/Transmitter (UART) that sequentially transmits binary data. For example, a program on the master may generate a command that conforms to the Modbus standard and send the command through the UART. The slave can receive the binary data with the slave's UART. The UART can provide the binary data to the slave's program or embedded system, which can interpret the binary data according to the Modbus standard. The slave can then generate a response to the command and send it through the UART to the master. The response is then interpreted by the master according to the Modbus standard. Similar methods can be employed with other serial communication protocols.

As can be appreciated, the correct interpretation of the sequentially transmitted binary data must be according to the serial communication protocols. The communication protocols can define timing intervals such as the time to complete a communication, wait periods between receiving and transmitting, bit sizes of fields in the communication, or the like. For example, if the master's UART transmits a request packet, where there is a gap in the binary data (an intervening one-character silence), the slave will not see this as two independent request packets. If the gap exceeds 3.5 character times, then the slave will incorrectly see this as two independent request packets.

The Universal Serial Bus (USB) is gradually replacing older UART-based serial communication protocols as a de-facto hardware standard. For example, many computers that functioned as masters in the UART-based serial communication protocols are being replaced by computers with USB interfaces. However, programs that employ the UART-based serial communication protocols are still being utilized in many applications. To communicate through the USB interfaces, the serial communications are 'stacked' on a virtual UART layer and transmitted over the USB interface according to the USB standard.

However, when UART-based serial communications that rely on timing are transmitted over the USB interface, timing errors can result when the communications are interpreted. Accordingly, there is a need for a stack timing adjustment for serial communications.

SUMMARY

A method for stack timing adjustment for serial communications is provided. According to an embodiment, the method comprises receiving a USB communication, decoding the USB communication into UART frames, and adjusting a timing of the UART frames according to a serial protocol.

A USB device with stack timing adjustment for serial communications is provided. According to an embodiment, the USB device with stack timing adjustment comprises a USB controller configured to receive a USB communication and extract an encoded serial packet from the USB communication. The USB device with stack timing adjustment further comprises a microprocessor configured to decode the encoded serial packet into UART frames and a stack timing adjustment configured to adjust a timing of the UART frames according to a serial protocol.

A communications system with stack timing adjustment for serial communications is provided. According to an embodiment, the communications system with stack timing adjustment for serial communications comprises a USB device that is adapted to encode a serial packet into a USB communication and a USB device with stack timing adjustment in communication with the USB device. The USB with stack timing adjustment is configured to extract and decode the serial packet from the USB communication and adjust a timing of the serial packet.

Aspects

According to an aspect, a method for stack timing adjustment for serial communications comprises receiving a USB communication, decoding the USB communication into UART frames, and adjusting a timing of the UART frames according to a serial protocol.

Preferably, the step of decoding the USB communication into UART frames comprises ordering the UART frames.

Preferably, the step of adjusting the timing of the UART frames according to the serial protocol comprises adding a delay between two or more serial packets encoded into the USB communication.

Preferably, the step of adjusting the timing of the UART frames according to the serial protocol comprises removing inter-character delays added to a serial packet encoded into the USB communication.

Preferably, the serial protocol comprises a Modbus protocol.

Preferably, the serial protocol comprises a HART protocol.

Preferably, the USB communication comprises a USB CDC message with a serial packet.

According to an aspect, a USB device with stack timing adjustment (100) comprises a USB controller (100a) configured to receive a USB communication and extract an encoded serial packet from the USB communication, a microprocessor (100b) configured to decode the encoded serial packet into UART frames, and a stack timing adjustment circuit (100c) configured to adjust a timing of the UART frames according to a serial protocol.

Preferably, the microprocessor (100b) is further configured to order the UART frames in a sequence.

Preferably, the stack timing adjustment circuit (100c) configured to adjust the timing of the UART frames according to the serial protocol comprises the stack timing adjustment circuit (100c) configured to add a time delay between two or more of the serial packets encoded into the USB communication.

Preferably, the stack timing adjustment circuit (100c) configured to adjust the timing of the UART frames according to the serial protocol comprises the stack timing adjustment circuit (100c) configured to remove inter-character delays added to the serial packet encoded into the USB communication.

Preferably, the serial protocol comprises a Modbus protocol.

Preferably, the serial protocol comprises a HART protocol.

Preferably, the USB communication comprises a USB CDC message with a serial packet.

According to an aspect, a communications system with stack timing adjustment (50) for serial communications comprises a USB device (200) that is adapted to encode a serial packet into a USB communication and a USB device with stack timing adjustment (100) in communication with the USB device (200). The USB device with stack timing adjustment is configured to extract and decode the serial packet from the USB communication and adjust a timing of the serial packet.

Preferably, the USB device with stack timing adjustment (100) is further configured to respond to the serial packet with a serial response packet that is encoded into a response USB communication.

Preferably, the USB device (200) is a master that is further configured to encode a serial request packet into the USB communication.

BRIEF DESCRIPTION OF THE DRAWINGS

The same reference number represents the same element on all drawings. It should be understood that the drawings are not necessarily to scale.

DETAILED DESCRIPTION

FIGS. 1-8 and the following description depict specific examples to teach those skilled in the art how to make and use the best mode of embodiments of a stack timing adjustment for serial communications. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the stack timing adjustment for serial communications. As a result, the embodiments described below are not limited to the specific examples described below, but only by the claims and their equivalents.

Figure 1:
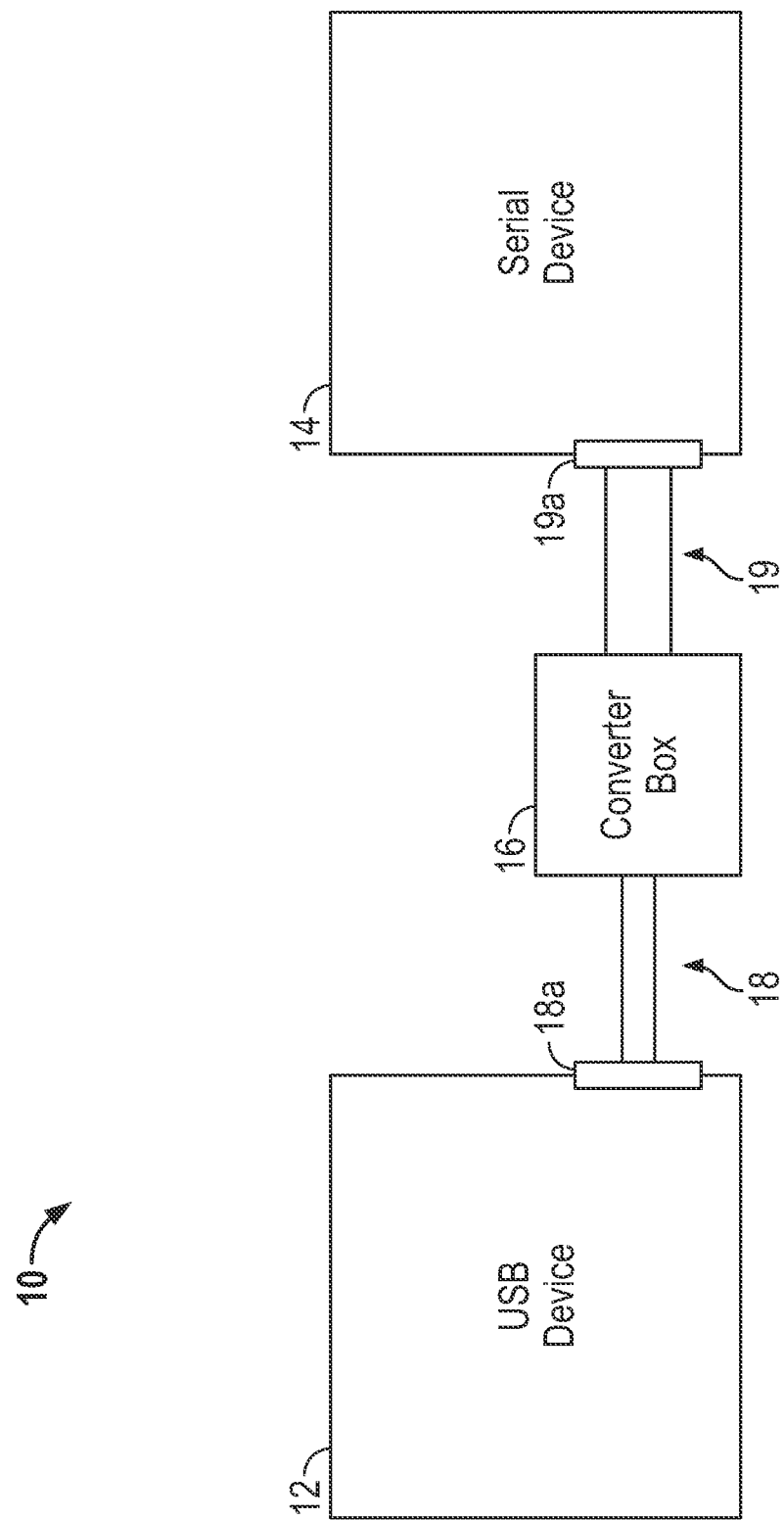
FIG. 1 shows a block diagram 10 of a prior art communications system with a USB device 12 and a serial device 14.

FIG. 1 shows a block diagram 10 of a prior art communications system with a USB device 12 and a serial device 14. In the arrangement shown in FIG. 1, a converter box 16 is between the USB device 12 and the serial device 14. A USB cable 18 couples the converter box 16 to the USB device 12 through a USB port 18a. The converter box 16 is also coupled to the serial device 14 with a serial communications cable 19 through a serial communications port 19a. The following is a more detailed description of the serial device 14 and the converter box 16 that shows how hardware redundancy can be eliminated by the stack timing adjustment for serial communications.

Figure 2:
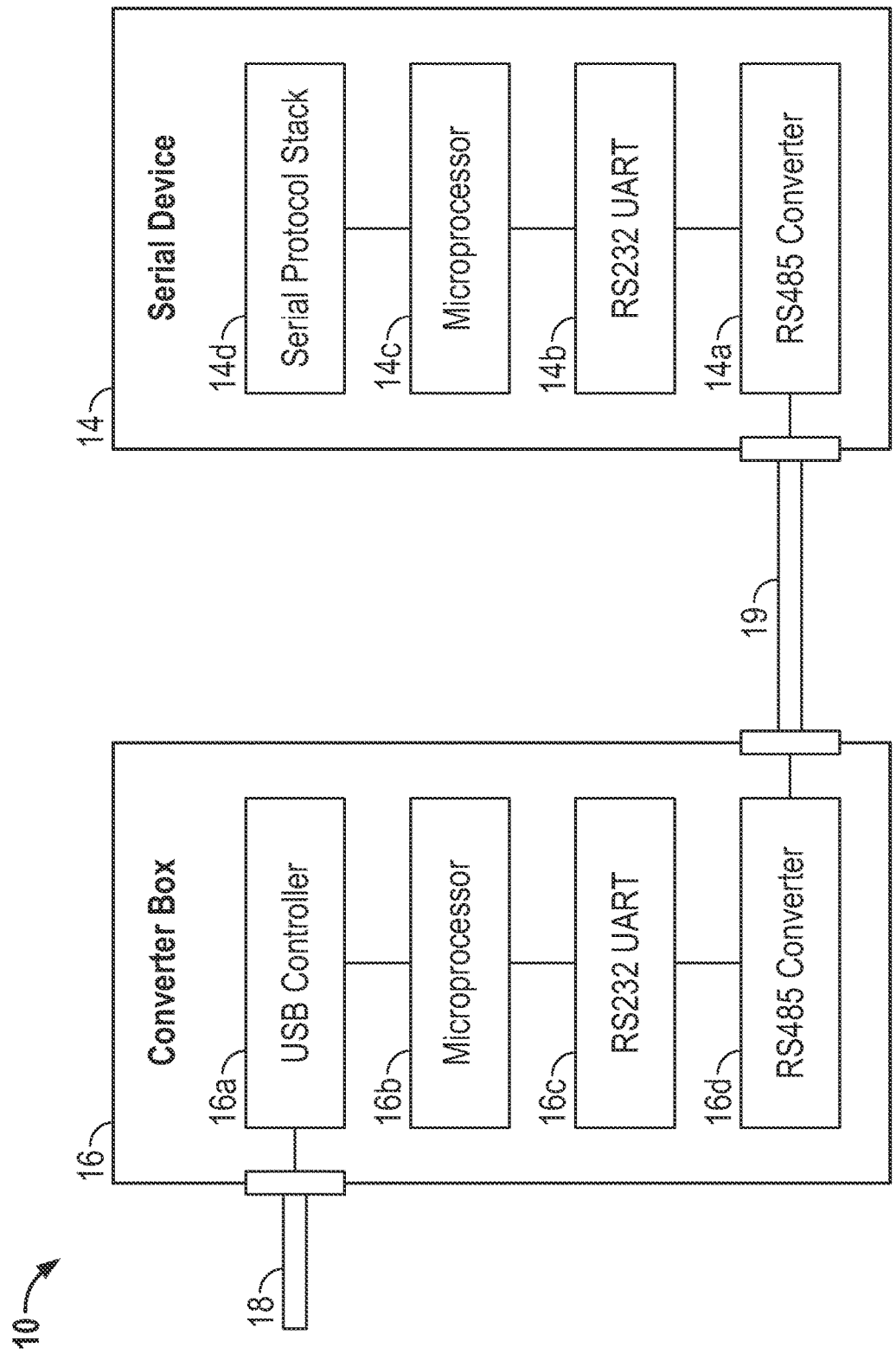
FIG. 2 shows a more detailed partial view of the block diagram 10 shown in FIG. 1.

FIG. 2 shows a more detailed partial view of the block diagram 10 shown in FIG. 1. The block diagram 10 includes the serial device 14, the converter box 16, the USB cable 18, and the serial communications cable 19 described with reference to FIG. 1. Also shown is a RS485 converter 14a that is coupled to the serial communications cable 19. However, in alternative embodiments, other physical layers can be employed, such as the Bell202 or the RS422 physical layers. The RS485 converter 14a is also shown as being in communication with a RS232 UART 14b. Alternatively, the RS485 converter 14a may not be employed. Instead, the RS232 UART 14b may be employed to communicate with the converter box 16. In the embodiment shown, a microprocessor 14c is coupled to the RS232 UART 14b. The microprocessor 14c provides a serial protocol stack 14d to, for example, a software executing on the USB device 12. FIG. 2 also shows the converter box 16 as having a USB controller 16a that is coupled to the USB cable 18. In the converter box 16, a microprocessor 16b is coupled to the USB controller 16a and a RS232 UART 16c. The RS232 UART 16c is coupled to a RS485 converter 16d. Alternatively, the RS485 converter 16d may not be employed. Instead, the RS232 UART 16c may be in communication with the serial device 14. In the embodiment shown, the RS485 converter 16d is coupled to the serial communications cable 19 and in communication with the RS485 converter 14a in the serial device 14.

As can be appreciated from FIG. 2, the use of the RS485 converter 14a can require redundant hardware. For example, both of the serial device 14 and the converter box 16 include the microprocessors 14c, 16b, the RS232 UARTs 14b, 16c, and the RS485 converters 14a, 16d. The functions of the redundant hardware involve the encoding and decoding of the serial communications between the USB device 12 and the serial device 14. For example, the RS485 converter 16d in the converter box 16 encodes the UART frames from the RS232 UART 16c and the RS485 converter 14a in the serial device 14 decodes the UART frames. Accordingly, eliminating the redundant functions of encoding and decoding the UART frames can eliminate the redundant hardware. The following description illustrates how the stack timing adjustment can reduce or eliminate timing errors and redundant communications hardware.

Figure 3:
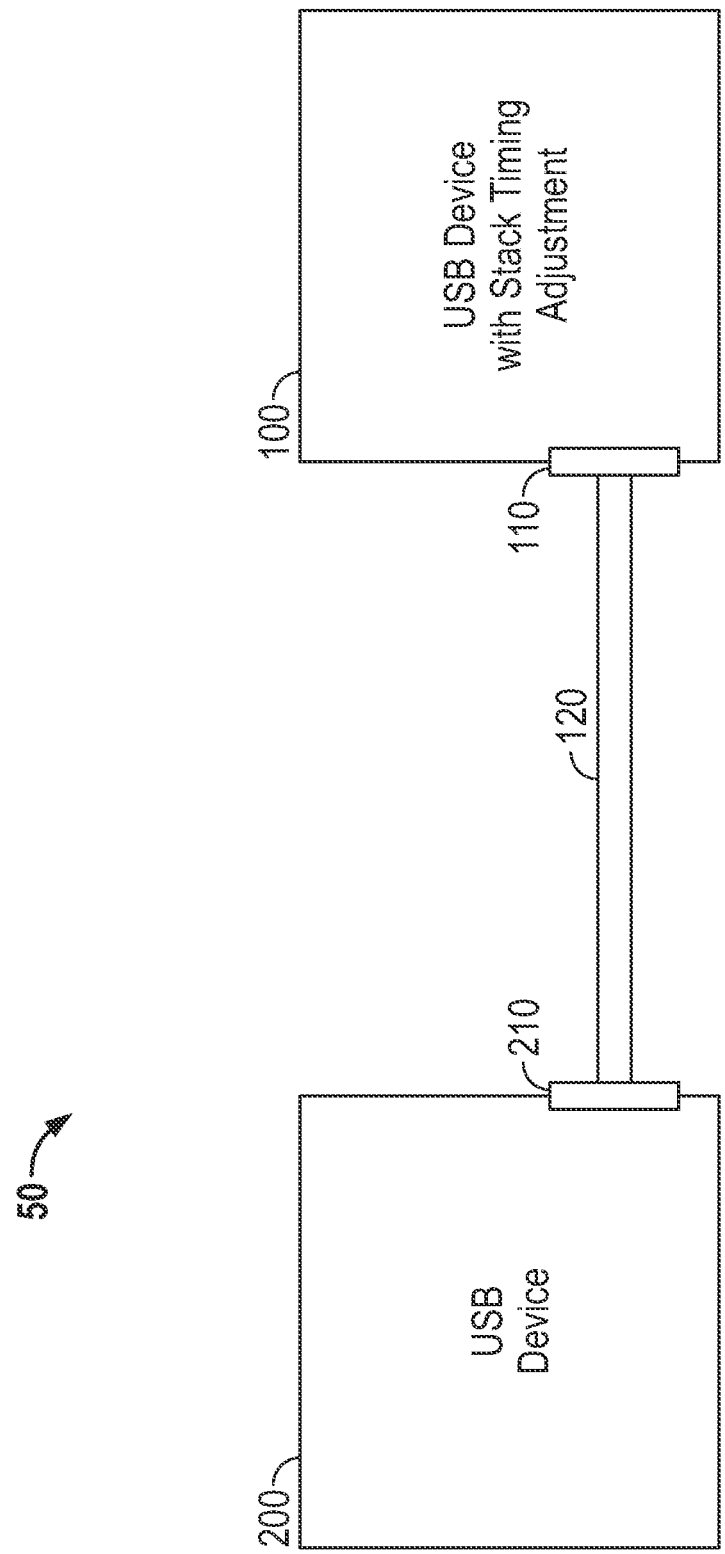
FIG. 3 shows a block diagram of a communications system with stack timing adjustment 50 according to an embodiment.

FIG. 3 shows a block diagram of a communications system with stack timing adjustment 50 according to an embodiment. In the embodiment shown, the communications system with stack timing adjustment 50 includes a USB device with stack timing adjustment 100 coupled to a USB device 200 with a USB cable 120. The USB cable 120 is coupled to the USB device with stack timing adjustment 100 through the USB port 110 and to the USB device 200 through a USB port 210.

The USB device with stack timing adjustment 100 can be any appropriate USB device that can include the stack timing adjustment of serial communications. For example, the USB device with stack timing adjustment 100 may be a flow meter transmitter that includes software that generates a serial packet. In some embodiments, data may be obtained from the flow meter and converted into the serial packet in response to a request from the USB device 200. The serial packet may be generated according to a serial communications protocol. In this exemplary embodiment, the USB device with stack timing adjustment 100 may be a slave to the USB device 200.

The USB device 200 can be any appropriate USB device that is able to communicate with the USB device with stack timing adjustment 100. For example, in the foregoing example where the USB device with stack timing adjustment 100 is the transmitter that obtains the data from the flow meter, the USB device 200 may be a personal computer running software that can send a serial request packet. The serial request packet may comply with the serial communications protocol employed by the USB device with stack timing adjustment 100. Accordingly, the USB device with stack timing adjustment 100 can correctly interpret and respond to the serial request packet with a serial response packet.

As will be described in more detail in the following, the USB device 200 can encode the serial packet into a USB communication. For example, the serial request packet can be encoded into a USB communications device class (CDC) message. The USB CDC is a USB standard that defines communications between devices with different interfaces, such as serial interfaces. However, encoding the serial packet into a USB communication can add a delay, such as a time delay, to the serial packet. The delay can also be an inter-character delay between two or more characters in the serial packet. These and other delays can cause communication issues if the timing is not adjusted. For example, a time delay added to a Modbus serial request packet without a timing adjustment by a Modbus slave can prevent a response due to the presence of a 3.5 inter-character delay between two or more characters in the Modbus serial request packets. Inter-character delays can cause erroneous decoding of the serial request packets, which can lead to incorrect data responses and commands and even catastrophic failures in industrial equipment. Additional details of the stack timing adjustment that can prevent such issues is described in the following.

Figure 4:
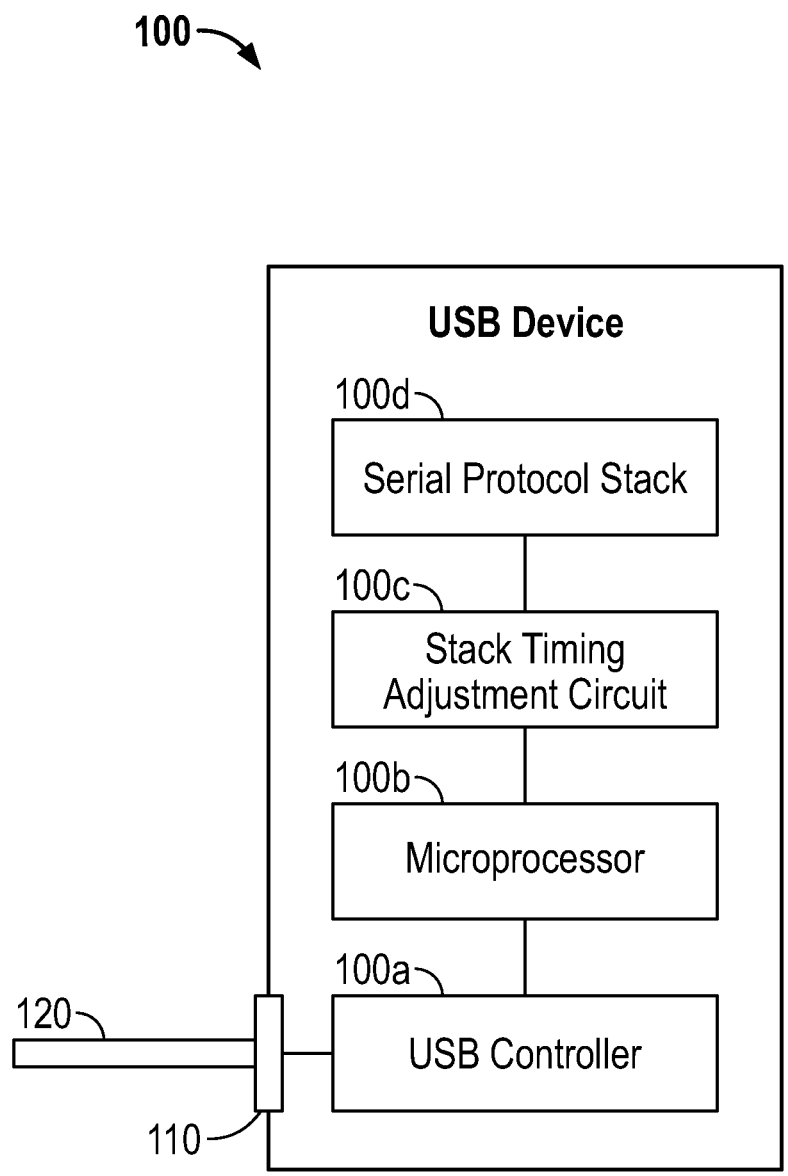
FIG. 4 shows a more detailed block diagram of the USB device with stack timing adjustment 100 described with reference to FIG. 3.

FIG. 4 shows a more detailed block diagram of the USB device with stack timing adjustment 100 described with reference to FIG. 3. As shown in FIG. 4, the USB device with stack timing adjustment 100 includes a USB controller 100a that is coupled to the USB cable 120 via the USB port 110. The USB controller 100a is coupled to a microprocessor 100b. A stack timing adjustment circuit 100c is shown as being coupled to the microprocessor 100b. In alternative embodiments, the stack timing adjustment circuit 100c may be part of the microprocessor 100b. The stack timing adjustment circuit 100c can provide a serial protocol stack 100d to, for example, software executing on the USB device with stack timing adjustment 100.

The USB controller 100a can receive a USB communication from the USB device 200. The USB communication may be comprised of a USB CDC message with the serial packet generated by the software executing on the USB device 200. The details of encoding the serial packet into the USB communication are described in more detail in the following with reference to FIGS. 5-8. The USB controller 100a can be any appropriate USB controller that is able to decode the USB communication to extract the encoded serial packet from the USB communication. The USB controller 100a may extract and provide the encoded serial packet to the microprocessor 100b.

The microprocessor 100b can be configured to decode the encoded serial packet into UART frames. The microprocessor 100b can be any appropriate microprocessor that is able to decode the encoded serial packet into UART frames. For example, the microprocessor 100b can be a processor that executes software that receives the extracted serial packet at the high clock rate, buffers the encoded serial packet so the data rate complies with the UART format, and order the UART frames in an appropriate sequence. The decoded UART frames can be provided to the stack timing adjustment circuit 100c.

The stack timing adjustment circuit 100c can receive the decoded UART frames from the microprocessor 100b. Although the decoded UART frames from the microprocessor 100b may be ordered and have a data rate that complies with the UART standard, the UART frames may still have the delays discussed in the foregoing. For example, the UART frames may have inter-character delays or inappropriate time delays between the serial packets. The stack timing adjustment circuit 100c can adjust the timing of the UART frames according to a serial protocol, as will be discussed in the following with reference to FIGS. 5-8. Accordingly, the stack timing adjustment circuit 100c can provide the serial protocol stack 100d without the delays to, for example, software executing on the USB device with stacking timing adjustment 100.

The serial protocol stack 100d can be any serial protocol stack that is employed by the USB device with stack timing adjustment 100. For example, the USB device with stack timing adjustment 100 may have software that receives and sends communications that comply with the Modbus or HART standards. In the embodiment where the USB device with stack timing adjustment 100 is the flow meter, the serial protocol stack 100d can be the serial request packet sent by the USB device 200. Because the stack timing adjustment allows the serial communication to occur without errors caused by the delays, the USB device 200 can respond correctly to the serial request packet. Additional details of the encoding and decoding of the serial packet are described in the following.

Figure 5:
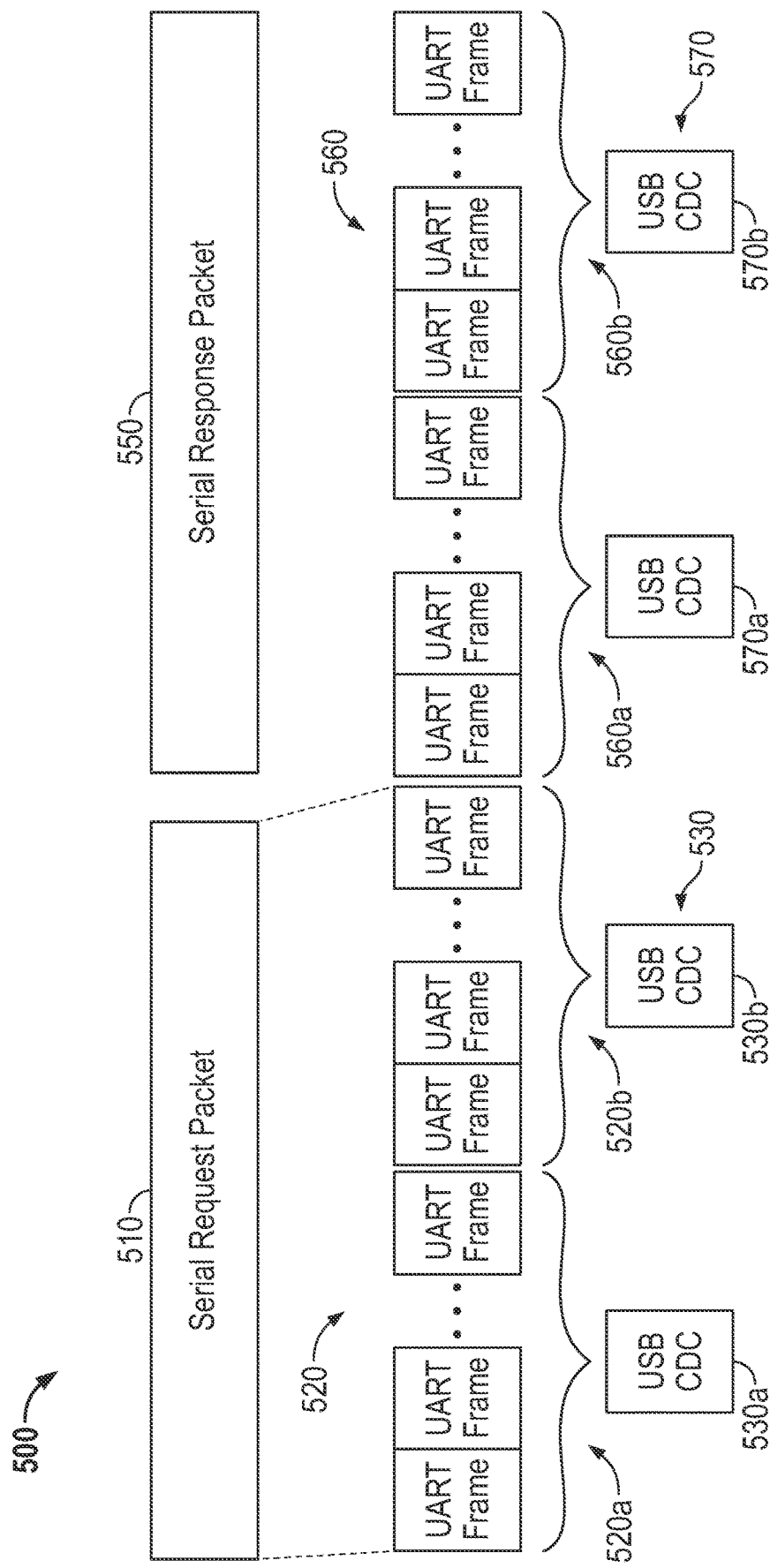
FIG. 5 shows a protocol stack with timing adjustment 500 according to an embodiment.

FIG. 5 shows a protocol stack with timing adjustment 500 according to an embodiment. In the embodiment of FIG. 5, a serial request packet 510 can be provided by, for example, the USB device 200 described with reference to FIGS. 3 and 4. As shown in FIG. 5, the serial request packet 510 is encoded into a plurality of UART frames 520. The plurality of UART frames 520 is shown as being comprised of a first set of UART frames 520a and a second set of UART frames 520b. In alternative embodiments, more or fewer UART frames may be employed. As can also be seen in FIG. 5, the plurality of UART frames 520 is encoded into a USB communication 530. The first set of UART frames 520a is encoded into a first USB CDC message 530a and the second set of UART frames 520b is encoded into a second USB CDC message 530b. In alternative embodiments, more or fewer USB CDC messages 530a, 530b may be employed. The USB communication 530 can be sent to the USB device with stack timing adjustment 100.

Also shown in FIG. 5 is a serial response packet 550 that can be sent by, for example, the USB device with stack timing adjustment 100 after receiving the USB communication 530. The serial response packet 550 can be sent to the USB device 200 described with reference to FIG. 3. In the embodiment of FIG. 5, the serial response packet 550 is encoded into a plurality of UART frames 560. The plurality of UART frames 560 is shown as comprised of a first set of UART frames 560a and a second set of UART frames 560b. The plurality of UART frames 560 is encoded into a USB communication 570. In the embodiment shown, the first set of UART frames 560a is encoded into a first USB CDC message 570a. The second set of UART frames 560b is encoded into a second USB CDC message 570b. The USB communication 570 can be sent to, for example, the USB device 200, in response to the serial request packet 510.

The serial request packet 510 can be a sequence of characters that conform to a serial communication standard, such as the Modbus and HART standards. However, other serial communication standards are within the scope of the present disclosure. The sequence of characters can represent a command, query, data, etc. For example, the sequence of characters might be a communication initiated by an application running on the USB device 200. The communication may be addressed to the USB device with stack timing adjustment 100 to request that data be provided to the USB device 200 via the USB cable 120.

The serial request packet 510 is encoded into the plurality of UART frames 520 according to an interface standard. For example, the plurality of UART frames 520 can be a conversion of the serial request packet 510 into a sequence of characters with timing and data rates that comply with a serial interface standard, such as the RS232 standard. However, instead of transmitting the plurality of UART frames 520 through a RS232 connector, the plurality of UART frames 520 is encoded into the USB communication 530.

A portion of the plurality of UART frames 520 can be included in a portion of the USB communication 530. For example, the USB CDC standard may allocate a portion of a USB CDC message for encapsulating data. The portion of each of the USB communication 530 that is used to encapsulate the data is sometimes known in the art as a payload. In some embodiments, the payload may have a limited byte-width. For example, the payload may be 64 bytes wide. Additionally, each of the plurality of UART frames 520 may not have the same byte-width as the payload. As a result, there may be unused characters in the payload. In addition, each of the plurality of UART frames 520 may be divided among different USB communications 530. In these and other embodiments, the USB communication 530 can be used to communicate the plurality of UART frames 520. Accordingly, the applications that are running on the USB device with stack timing adjustment 100 do not need to be modified or reprogrammed to communicate through, for example, the USB port 110.

Also shown in FIG. 5 is a time delay indicated by the dashed lines between the serial request packet 510 and the plurality of UART frames 520. The time delay can be due to the USB device with stack timing adjustment 100 having processing interrupts in, for example, the microprocessor 100b, or other delays while the serial request packet 510 is being decoded into the plurality of UART frames 520. The time delay is illustrated as being between the serial request packet 510 and the plurality of UART frames 520. However, as described in the foregoing, other delays may occur. For example, there may be delays between each of the plurality of UART frames 520, between two or more characters in each of plurality of UART frames 520, or the like.

As described in the foregoing with reference to FIGS. 3-4, the stack timing adjustment circuit 100c can remove the delays to ensure that the serial communications between the USB device with stack timing adjustment 100 and the USB device 200 occur without error. As can be appreciated, the stack timing adjustment circuit 100c may comply with a serial protocol. Exemplary serial protocols are described in more detail in the following with reference to FIGS. 6 and 7.

Figure 6:
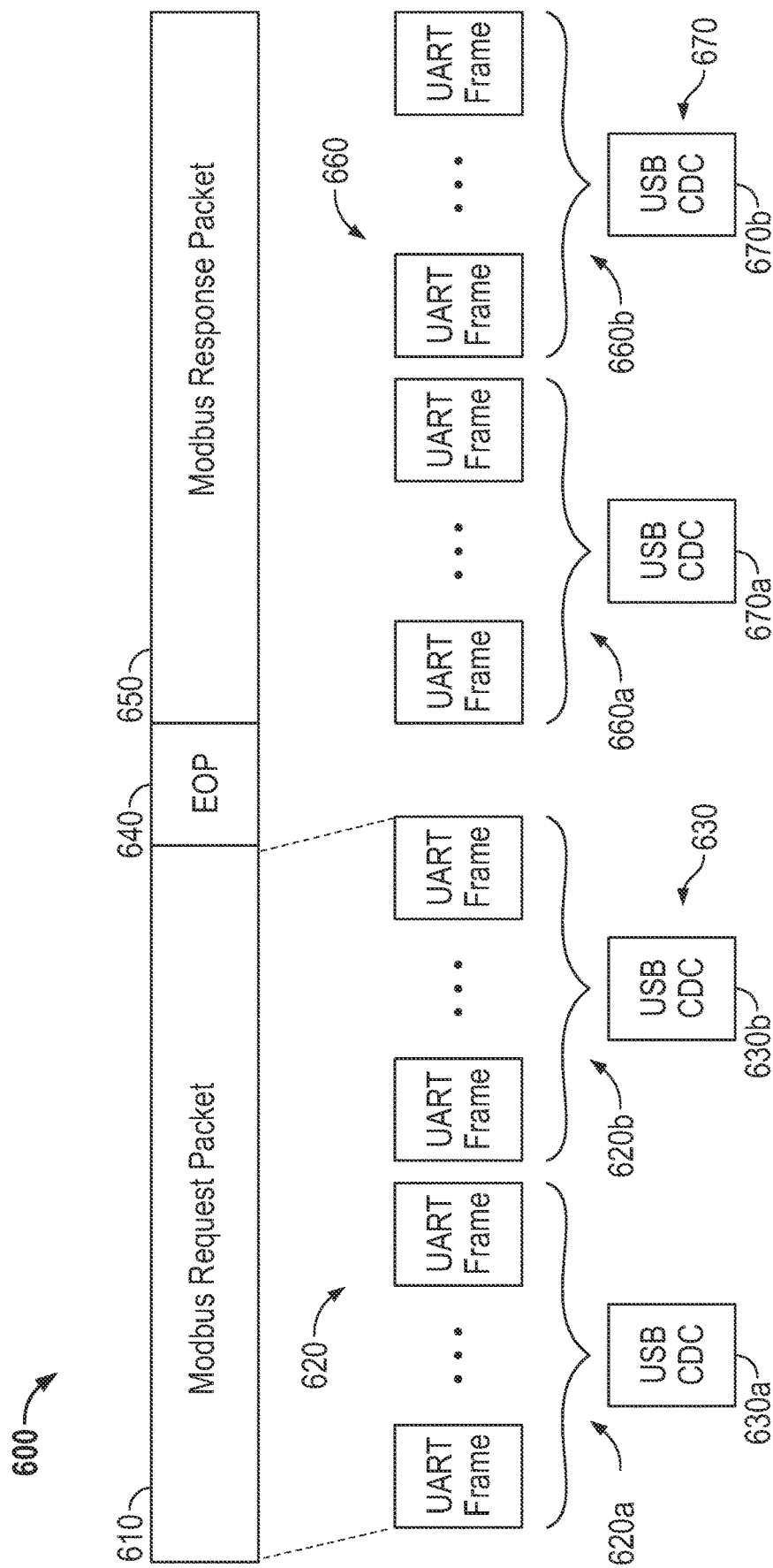
FIG. 6 shows a Modbus protocol stack with stack timing adjustment 600 according to an embodiment.

FIG. 6 shows a Modbus protocol stack with stack timing adjustment 600 according to an embodiment. In the embodiment of FIG. 6, a Modbus request packet 610 can be provided by, for example, the USB device 200 described with reference to FIGS. 3 and 4. As shown in FIG. 6, the Modbus request packet 610 is encoded into a plurality of UART frames 620. The plurality of UART frames 620 is shown as being comprised of a first set of UART frames 620a and a second set of UART frames 620b. In alternative embodiments, more or fewer UART frames may be employed. As can also be seen in FIG. 6, the plurality of UART frames 620 is encoded into a USB communication 630. The first set of UART frames 620a is encoded into a first USB CDC message 630a and the second set of UART frames 620b is encoded into a second USB CDC message 630b. In alternative embodiments, more or fewer USB CDC messages may be employed. The USB communication 630 can be sent to the USB device with stack timing adjustment 100.

An end-of-packet (EOP) 640 delay is also shown in FIG. 6. The EOP 640 is a delay or a period of time after the Modbus request packet 610 that allows a slave to respond. If the Modbus request packet 610 is received by the slave with the 3.5 character delay, the slave can respond with a Modbus response packet 650.

The Modbus response packet 650 can be sent by, for example, the USB device with stack timing adjustment 100 after receiving the USB communication 630. The Modbus response packet 650 can be sent to the USB device 200 described with reference to FIG. 3. In the embodiment of FIG. 6, the Modbus response packet 650 is encoded into a plurality of UART frames 660. The plurality of UART frames 660 is shown as comprised of a first set of UART frames 660a and a second set of UART frames 660b. The plurality of UART frames 660 is encoded into a USB communication 670. In the embodiment shown, the first set of UART frames 660a is encoded into a first USB CDC message 670a. The second set of UART frames 660b is encoded into a second USB CDC message 670b. The USB communication 670 can be sent to, for example, the USB device 200 in response to the Modbus request packet 610.

The Modbus request packet 610 can be a sequence of characters that conform to the Modbus communications standard. The sequence can include commands sent by a master to a slave. However, due to the delay illustrated by the dashed lines shown in FIG. 6, the USB device with stack timing adjustment 100 is unable to respond without adjusting the timing of the Modbus request packet 610. For example, decoding the Modbus request packet 610 into the plurality of UART frames 620 may cause the timing of the Modbus request packet 610 to shift thereby reducing the EOP 640 to less than 3.5 characters. As a result, the slave is unable to respond to the Modbus request packet 610.

In addition, the Modbus standard divides the Modbus request packet 610 to portions or fields defined by bit lengths. For example, the Modbus RTU frame format can have a data portion after an address and function fields. Encoding the Modbus request packet 610 into the USB communication 630 can insert characters or bits into these fields. For example, as described in the foregoing with reference to FIG. 5, the Modbus request packet 610 can be divided among two or more USB communication 630. This division can cause additional characters to be inserted into the Modbus request packet 610. Similar delays can be added to the serial packets in the HART protocol, which will be described in more detail in the following.

Figure 7:
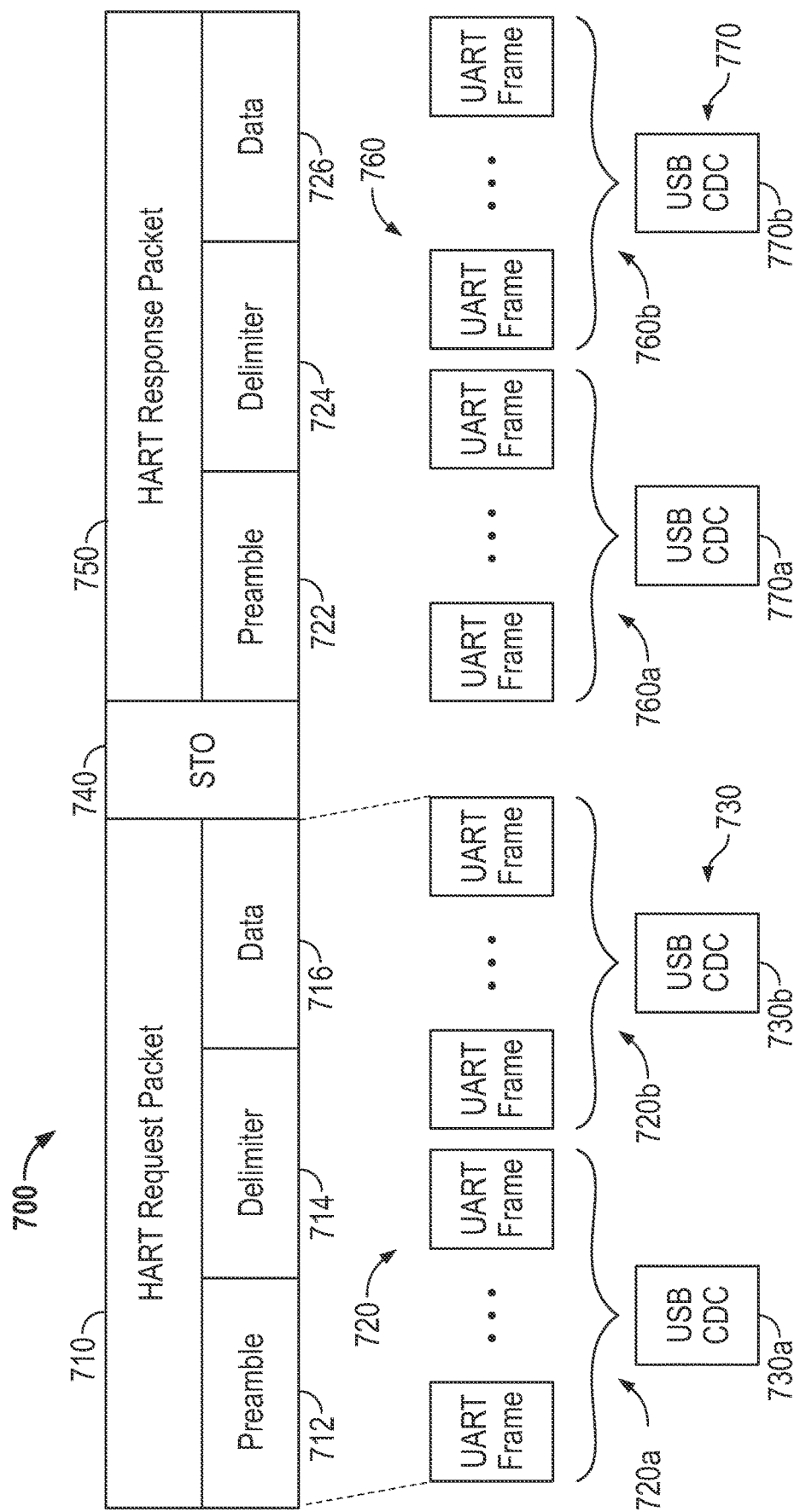
FIG. 7 shows a HART protocol stack with stack timing adjustment 700 according to an embodiment.

FIG. 7 shows a HART protocol stack with stack timing adjustment 700 according to an embodiment. In the embodiment of FIG. 7, a HART request packet 710 can be provided by, for example, the USB device 200 described with reference to FIGS. 3 and 4. As shown in FIG. 7, the HART request packet 710 is encoded into a plurality of UART frames 720. The plurality of UART frames 720 is shown as being comprised of a first set of UART frames 720a and a second set of UART frames 720b. In alternative embodiments, more or fewer UART frames may be employed. As can also be seen in FIG. 7, the plurality of UART frames 720 is encoded into a USB communication 730. The first set of UART frames 720a is encoded into a first USB CDC message 730a and the second set of UART frames 720b is encoded into a second USB CDC message 730b. In alternative embodiments, more or fewer USB CDC messages 730a, 730b may be employed. The USB communication 730 can be sent to the USB device with stack timing adjustment 100.

A slave time-out (STO) 740 period is also shown in FIG. 7. The STO 740 is a maximum period of time after the HART request packet 710 in which the slave in the HART standard must start to respond with, for example, the HART response packet 750.

The HART response packet 750 can be sent by, for example, the USB device with stack timing adjustment 100 after receiving the USB communication 730. The HART response packet 750 can be sent to the USB device 200 described with reference to FIG. 3. In the embodiment of FIG. 7, the HART response packet 750 is encoded into a plurality of UART frames 760. The plurality of UART frames 760 is shown as comprised of a first set of UART frames 760a and a second set of UART frames 760b. The plurality of UART frames 760 is encoded into a USB communication 770. In the embodiment shown, the first set of UART frames 760a is encoded into a first USB CDC message 770a. The second set of UART frames 760b is encoded into a second USB CDC message 770b. The USB communication 770 can be sent to, for example, the USB device 200, in response to the HART request packet 710.

The HART request packet 710 can be a sequence of characters that conform to the HART communications standard. The sequence can include commands sent by a master to a slave. However, due to the delay illustrated by the dashed lines shown in FIG. 7, the USB device with stack timing adjustment 100 may not be able to respond without timing adjustment of the HART request packet 710. For example, decoding the HART request packet 710 into the plurality of UART frames 720 may cause the timing of the HART request packet 710 to shift thereby reducing the length of the STO 740. As a result, the slave is unable to respond to the HART request packet 710.

In addition, the HART standard divides the HART request packet 710 to portions or fields defined by bit lengths. As shown in FIG. 7, the HART request packet 710 is comprised of a preamble 712, a delimiter 714, and a data 716 portion. The HART response packet 750 is similarly divided into a preamble 752, a delimiter 754, and a data 756 portion. The preamble 712, 752 is a synchronization and carrier detection field. The delimiter 714, 754 separates the preamble 712, 752 from the data 716, 756 portion. Although not shown in FIG. 7, the data 716, 756 is comprised of the address, command, size, status, data field, and checksum fields in the HART protocol.

The foregoing described delays can be removed from the serial packets, such as the serial request packets 510-710, with a stack timing adjustment, as will be described in more detail in the following.

Figure 8:
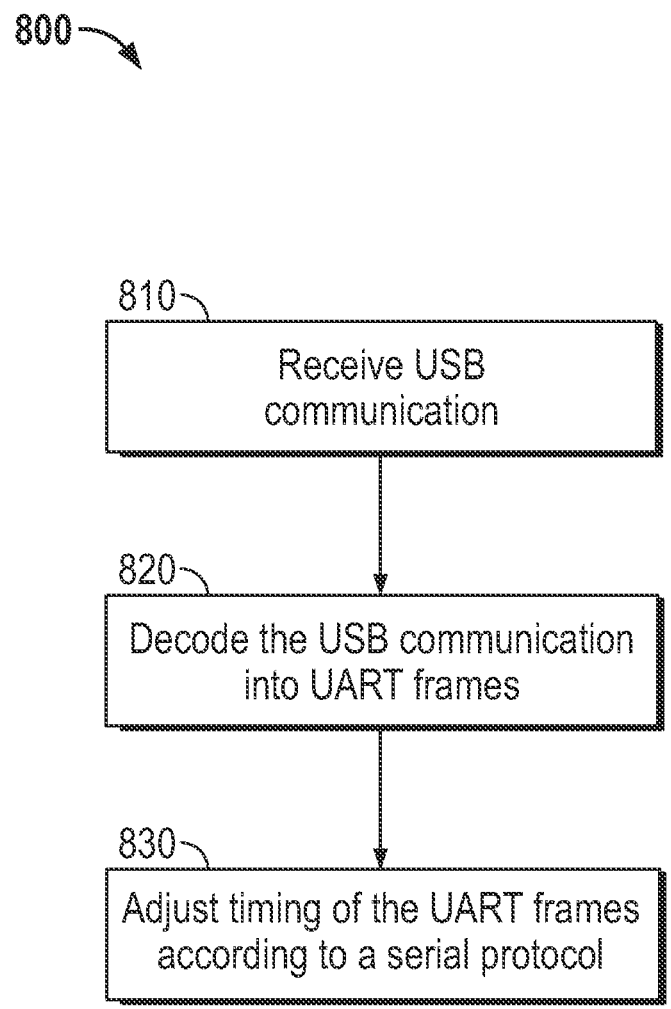
FIG. 8 shows a method for stack timing adjustment 800 for serial communications according to an embodiment.

FIG. 8 shows a method for stack timing adjustment 800 for serial communications according to an embodiment. The method 800 includes receiving a USB communication 810, decoding the USB communication into UART frames 820, and adjusting the timing of the UART frames according to a serial protocol 830.

As discussed in the foregoing, the step of receiving the USB communication 810 can be comprised of receiving a USB CDC communication. The USB communication 530 can include the serial request packet 510 that is encoded into the USB communication 530 by the USB device 200. As described in the foregoing, the encoding can add delays, such as a timing delay, to the serial packet.

The step of decoding the USB communication into UART frames 820 can include various operations. For example, decoding the USB communication into UART frames 820 can include ordering the UART frames in a sequence that is the same as the UART frames encoded into the USB communication. Additionally or alternatively, decoding the USB communication into UART frames can include buffering the encoded UART frames to a rate that is compliant with the data rate of an interface standard.

The step of adjusting the timing of the UART frames according to a serial protocol 830 can include operations that adjust time delays between serial packets, inter-character delays, or the like. For example, adjusting the timing of the UART frames according to the serial protocol 830 can include removing an inter-character delay in the UART frames. Additionally or alternatively, a time delay between serial packets can also be adjusted. Adjusting the timing of the UART frames can include proving an end-of-packet delay, such as the EOP 640 or the STO 740 described in the foregoing. If the end-of-packet delay does not meet the serial communication standard, a delay may be added to the serial request packet 510-710. Accordingly, the USB device with stack timing adjustment 100 is able to respond correctly to the serial request packet 510-710.

The embodiments described above provides stack timing adjustment for serial communications. As explained above, the method for stack timing adjustment 800 can adjust the timing of the plurality of UART frames 520-720. Adjusting the timing of the plurality of UART frames 520-720 can include removing delays, such as timing delays, inter-character delays, or the like added to a serial request packet 510-710. By removing the delays, the USB device with stack timing adjustment 100 can correctly interpret the serial packets, such as the serial request packet 510 sent by the USB device 200.

The USB device with stack timing adjustment 100 can include the stack timing adjustment circuit 100c to perform the method for stack timing adjustment 800. The USB device with stack timing adjustment 100 can therefore correctly execute commands in the serial packet. For example, the USB device with stack timing adjustment 100 can be a transmitter that reads data from a flow meter and sends the data to the USB device 200 via a serial response packet 550-750.

Including the stack timing adjustment circuit 100c in the USB device with stack timing adjustment 100 can reduce or eliminate components and devices. For example, the converter box 16 described with reference to FIGS. 1 and 2 is not needed. In addition, the RS485 converter 14a described with reference to FIG. 2 is not needed. Additionally, the data rates for communications between the USB device 200 and the USB device with stack timing adjustment 100 can be improved. For example, the USB communication 530-730 can be transmitted at much higher rates than many serial interface standards, such as the RS232 standard.

Including the method for stack timing adjustment 800 in the USB device with stack timing adjustment 100 can also eliminate the need for customers to modify software, ensure compatibility of converter boxes, etc. For example, software executing on the USB device 200 do not need to be updated with, for example, proprietary USB communications protocol. The software can continue to send serial packets, such as the serial request packets 510-710, without modifying or developing new software.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other stack timing adjustment for serial protocols, and not just to the embodiments described above and shown in the accompanying figures. Accordingly, the scope of the embodiments described above should be determined from the following claims.

We claim:

1. A method for stack timing adjustment for serial communications, the method comprising:
   receiving a universal serial bus (USB) communication;
   decoding the received USB communication into universal asynchronous receiver/transmitter (UART) frames; and
   adjusting a timing of the decoded UART frames according to a serial protocol by one of:
      adding a delay to the decoded UART frames; and
      removing a delay from the decoded UART frames.

2. The method of claim 1, wherein the step of decoding the USB communication into UART frames comprises ordering the UART frames.

3. The method of claim 1, wherein the step of adjusting the timing of the decoded UART frames according to the serial protocol comprises adding a delay between two or more serial packets encoded into the received USB communication.

4. The method of claim 1, wherein the step of adjusting the timing of the decoded UART frames according to the serial protocol comprises removing inter-character delays added to a serial packet encoded into the received USB communication.

5. The method of claim 1, wherein the serial protocol comprises a Modbus protocol.

6. The method of claim 1, wherein the serial protocol comprises a highway addressable remote transducer (HART) protocol.

7. The method of claim 1, wherein the USB communication comprises a USB communication device class (CDC) message with a serial packet.

8. A universal serial bus (USB) device with stack timing adjustment for serial communications, comprising:
   a USB controller configured to:
      receive a USB communication; and
      extract an encoded serial packet from the USB communication;
   a microprocessor configured to decode the encoded serial packet into universal asynchronous receiver/transmitter (UART) frames; and
   a stack timing adjustment circuit configured to adjust a timing of the decoded UART frames according to a serial protocol by one of:
      adding a delay to the decoded UART frames; and
      removing a delay from the decoded UART frames.

9. The USB device with stack timing adjustment according to claim 8, wherein the microprocessor is further configured to order the UART frames in a sequence.

10. The USB device with stack timing adjustment of claim 8, wherein the stack timing adjustment circuit configured to adjust the timing of the decoded UART frames according to the serial protocol comprises the stack timing adjustment circuit configured to add a time delay between two or more of the serial packets encoded into the received USB communication.

11. The USB device with stack timing adjustment of claim 8, wherein the stack timing adjustment circuit configured to adjust the timing of the decoded UART frames according to the serial protocol comprises the stack timing adjustment circuit configured to remove inter-character delays added to the serial packet encoded into the received USB communication.

12. The USB device with stack timing adjustment of claim 8, wherein the serial protocol comprises a Modbus protocol.

13. The USB device with stack timing adjustment of claim 8, wherein the serial protocol comprises a highway addressable remote transducer (HART) protocol.

14. The USB device with stack timing adjustment of claim 8, wherein the USB communication comprises a USB communications device class (CDC) message with a serial packet.

15. A communications system with stack timing adjustment for serial communications, comprising:
   a universal serial bus (USB) device that is adapted to encode a serial packet into a USB communication; and
   a USB device with stack timing adjustment in communication with the USB device and configured to:
      extract and decode the serial packet from the USB communication; and
      adjust a timing of the extracted and decoded serial packet by being configured to one of:
         add a delay to the extracted and decoded serial packet; and
         remove a delay from the extracted and decoded serial packet.

16. The communications system with stack timing adjustment of claim 15, wherein the USB device with stack timing adjustment is further configured to respond to the serial packet with a serial response packet that is encoded into a response USB communication.

17. The communications system with stack timing adjustment of claim 15, wherein the USB device is a master that is further configured to encode a serial request packet into the USB communication.

\* \* \* \* \*